United States Patent [19]

Frezza

[11] Patent Number: 4,638,356
[45] Date of Patent: Jan. 20, 1987

[54] APPARATUS AND METHOD FOR RESTRICTING ACCESS TO A COMMUNICATION NETWORK

[75] Inventor: William A. Frezza, Warminster, Pa.

[73] Assignee: General Instrument Corporation, New York, N.Y.

[21] Appl. No.: 716,384

[22] Filed: Mar. 27, 1985

[51] Int. Cl.⁴ .................. H04N 7/00; H04N 7/167; H04K 1/02; H04K 1/00
[52] U.S. Cl. .................. 358/118; 358/122; 358/86; 358/84; 358/114
[58] Field of Search .......... 358/114, 118, 122, 84, 358/86; 178/22.08, 22.13–22.16; 455/3, 5, 6

[56] References Cited

U.S. PATENT DOCUMENTS

| | | | |
|---|---|---|---|
| 4,148,064 | 4/1979 | Reed | 358/118 |
| 4,264,782 | 4/1981 | Konheim | 178/22.08 |
| 4,450,481 | 5/1984 | Dickinson | 358/84 |
| 4,458,109 | 7/1984 | Mueller-Schoer | 178/22.16 |
| 4,500,750 | 2/1985 | Elander et al. | 178/22.14 |
| 4,533,948 | 8/1985 | McNamara et al. | 358/122 |

Primary Examiner—Stephen C. Buczinski
Assistant Examiner—Melissa Koltak
Attorney, Agent, or Firm—Barry R. Lipsitz

[57] ABSTRACT

Apparatus restricts access to a communication network having at least one service node for providing services to subscribers. A subscriber terminal, coupled to the communication network, includes a secret node key. A succession of frame verifier (FV) codes, derived through the use of the secret node key, is generated and transmitted on the network. A network access controller (NAC), coupled to the network, includes a record of the secret node key and uses the key to encrypt a seed which is transmitted to the subscriber terminal for use in generating the FV codes. The NAC also independently computes the succession of FV codes which should be generated by the subscriber terminal. A distributed access controller (DAC), coupled to the communication network, includes a look-up table for storing the succession of FV codes computed by the NAC. The FV codes transmitted by the subscriber terminal are detected and compared to those stored in the look-up table. If proper correspondence between the detected and stored FV codes is not found to exist, the communication network is jammed.

15 Claims, 6 Drawing Figures

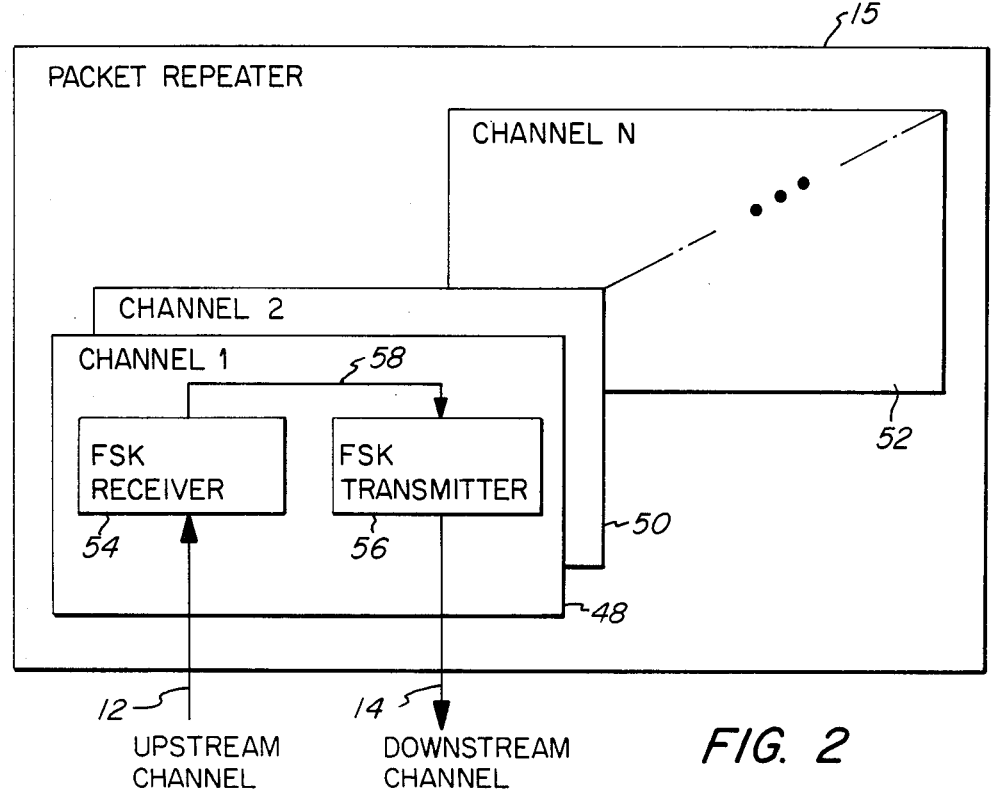
FIG. 2
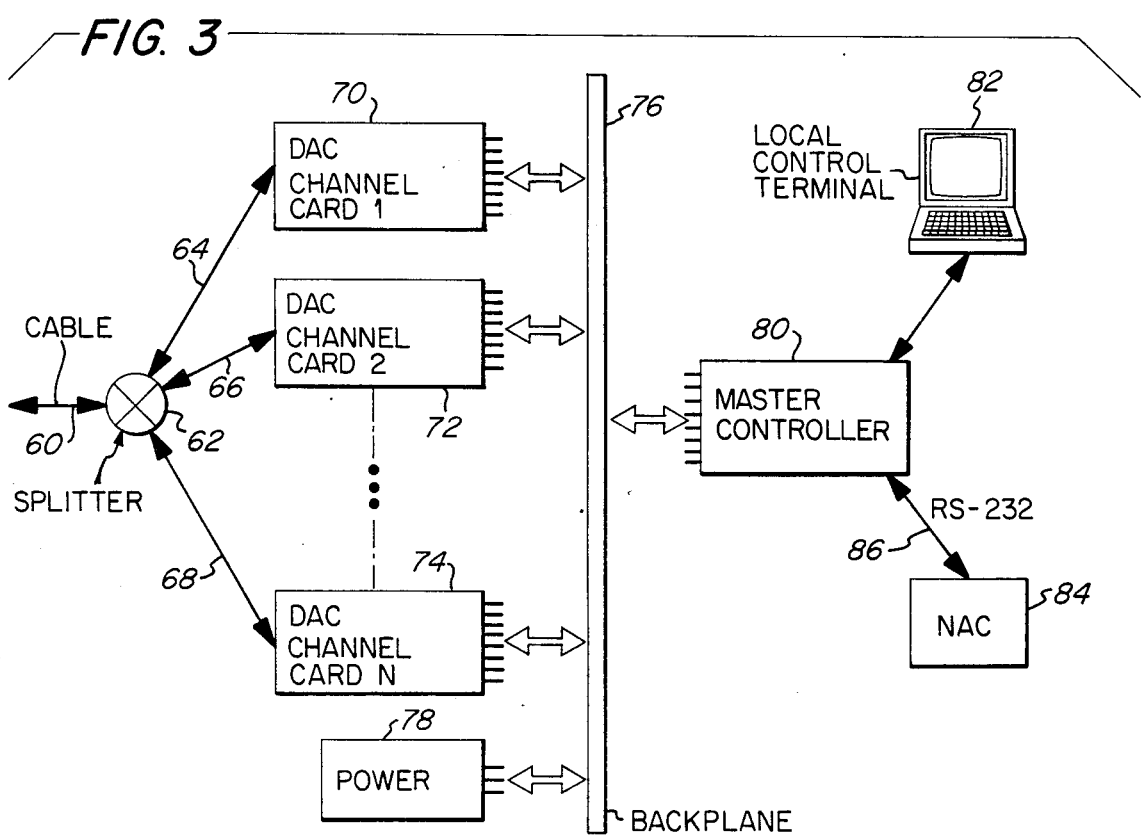

PACKET FORMAT

APPARATUS AND METHOD FOR RESTRICTING ACCESS TO A COMMUNICATION NETWORK

FIELD OF THE INVENTION

This invention relates to digital communication utilizing a communication network, for example a two-way cable television (CATV) network.

BACKGROUND OF THE INVENTION

Communication networks providing for bi-directional communication are well-known. An example of such a network, embodied in a CATV communication system, is provided in commonly assigned co-pending U.S. patent application Ser. No. 06/373,765, now U.S. Pat. No. 4,533,948, filed April 30, 1982, entitled "CATV Communication System", and incorporated herein by reference.

The pending application referred to discloses a mechanism by which access to CATV communication resources is controlled so that unauthorized users are denied access and authorized users are granted access. The CATV communication network includes an upstream communication path and a downstream communication path. A node originating a message (a source node), which can be located at any respective point in the CATV system, transmits a verification message, referred to as a frame verifier (FV) code, as part of an upstream message. The headend apparatus of the CATV system examines the frame verifier code and rebroadcasts the received upstream message in the downstream portion of the cable spectrum only if the frame verifier code indicates that the source node is an authorized user, thereby granting the user access to the CATV resources. Conversely, the headend apparatus does not rebroadcast the upstream message if the frame verifier code indicates that the source node is not an authorized user, thereby denying the user meaningful access to the CATV resources. Thus, system access control is centralized at the headend.

It would be advantageous to provide for decentralized control over access to a communication network. Such an arrangement would permit a simplified headend apparatus to be a simple digital data repeater which unconditionally rebroadcasts upstream received messages on a downstream channel. By decentralizing access control, the initial cost of a communication network can be substantially reduced since the headend is not required to contain the components for restricting access. Access control can be added to a communication network by the operator as desired after the system is up and running.

It would be further advantageous to provide a communication network which does not rely on the headend equipment for access control because the headend environment is often very harsh. For example, it is not uncommon to place the headend equipment at the top of a mountain. Such environments require the equipment to be ruggedized. It is therefore desirable to keep the amount and complexity of the equipment at such sites to a minimum.

SUMMARY OF THE INVENTION

In accordance with the present invention, a communication network is provided which has an upstream communication channel and a downstream communication channel. At least one service node provides services to subscribers using the network. At least one subscriber node includes a secret node key, means for generating a frame verifier code derived through the use of the secret node key, and means for transmitting the frame verifier code on the upstream communication channel of the network. Packet repeater means receives communications on the upstream communication channel and unconditionally retransmits the same on the downstream communication channel. Access restricting apparatus allows only authorized subscriber nodes to establish meaningful communication over the communication network. The access restricting apparatus includes means coupled to the downstream channel for examining the frame verifier code transmitted by the subscriber node for validity, and means for jamming the upstream channel if an invalid frame verifier code is detected.

The access restricting apparatus can be remotely located on the communication network from the packet repeater means. For example, the access restricting apparatus can be located at the service node so that the service provider can be responsible for the security of communications. The access restricting apparatus could alternately be located anywhere else on the network, so that another party, such as the network operator, can operate and maintain the apparatus. Placing the access restricting apparatus in a clean and relatively stable environment obviates the need to ruggedize the equipment, thereby lowering manufacturing and maintenance costs.

A plurality of subscriber nodes, each with a different secret node key, can be coupled to the communication network. A plurality of upstream and downstream channel pairs can be provided, wherein the jamming means jams only a particular upstream channel on which an unauthorized communication is attempted. The jamming means jams an upstream channel on a real time basis only when an unauthorized subscriber node is actively attempting to communicate on the network.

A method is provided for restricting access to a communication network to only authorized subscriber nodes. In accordance with the method, each authorized subscriber node is provided with a unique secret node key. The secret node key is used to enable a succession of frame verifier codes to be computed, which codes are transmitted from a subscriber node seeking access to the communication network. The frame verifier codes are then examined, to determine whether they are valid. If the frame verifier codes are not valid, the communication network is jammed to prevent communication thereon by the subscriber node.

BRIEF DESCRIPTION OF THE DRAWINGS

FIG. 2 is a block diagram of a packet repeater used in connection with the communication network of FIG. 1;

FIG. 3 is a block diagram of a distributed access controller for restricting access to the communication network of FIG. 1;

DETAILED DESCRIPTION OF THE INVENTION

In order to achieve a comprehensive understanding of the communication environment in which the present invention is used, the reader is referred to the disclosure in commonly assigned, co-pending U.S. patent application Ser. No. 06/373,765 (hereinafter, "the co-pending application"). Many of the terms used herein are the same as those used in the co-pending application, and the definitions of such terms are the same as in the co-pending application unless stated otherwise herein.

Figure 1:
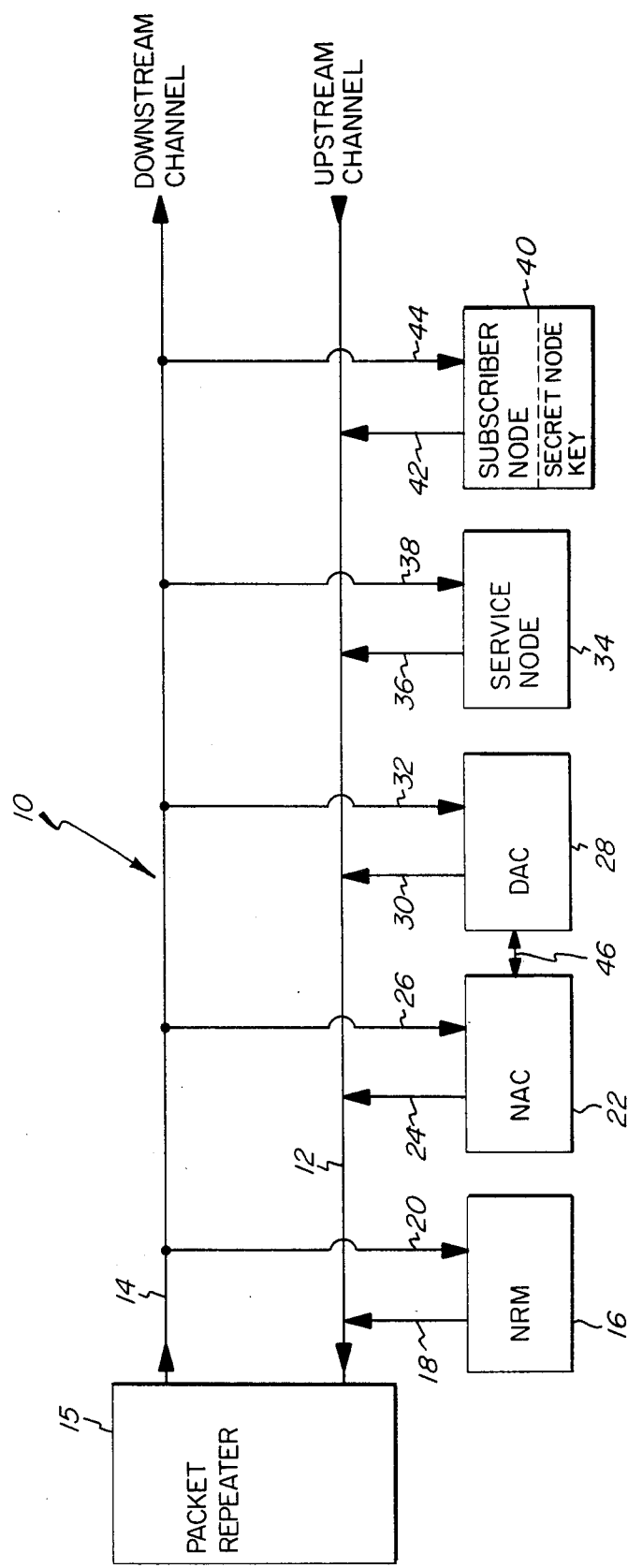
FIG. 1 is a block diagram of a communication network in accordance with the present invention.

A communication network 10 is shown in FIG. 1, having an upstream communication channel 12 and a downstream communication channel 14. A packet repeater 15 receives communications on upstream channel 12 and unconditionally retransmits the same on downstream channel 14.

Packet repeater 15 is shown in greater detail in FIG. 2. A plurality of channels are provided for as indicated by channel cards 48, 50, and 52. A typical communication network, such as a two-way cable television (CATV) network, generally provides a plurality of channels as described in the co-pending application.

Digital data signals are transmitted in the present example using frequency shift keyed (FSK) modulation. Accordingly, packet repeater 15 includes an FSK demodulator ("receiver") 54 and an FSK modulator ("transmitter") 56 for each different channel. A signal present on upstream channel 12 will be demodulated by FSK receiver 54, transferred to FSK transmitter 56 via path 58, and re-modulated for transmission on downstream channel 14. Thus, packet repeater 15 is a simple digital data repeater which unconditionally rebroadcasts upstream received messages on a downstream channel.

Those skilled in the art will appreciate that upstream channel 12 and downstream channel 14 can be provided on a single coaxial cable. In fact, a single coaxial cable can carry many different upstream/downstream channel pairs at the same time. And, each channel can carry a plurality of different signals through well known channel sharing techniques, such as that known as "CSMA/CD" and described in the co-pending application. Further, various components can be coupled to the communication network using a single coaxial cable.

As shown in FIG. 1, components such as a network resource manager (NRM) 16, a network access controller (NAC) 22, a distributed access controller (DAC) 28, a service node 34, and subscriber node 40 can all be coupled to the communication network. Each of these components is described in greater detail below.

The network resource manager (NRM) 16 is a specially programmed computer. An important function of NRM 16 is to allocate communication resources among various users of the communication network. One way this is achieved is by load leveling, i.e., by changing the channels on which subscriber nodes and service nodes communicate with each other so that the data traffic load is more evenly distributed among the available data channels. NRM 16 communicates with upstream channel 12 via path 18, and downstream channel 14 via path 20. Paths 18 and 20 can comprise a single coaxial cable coupled to the communication network.

Network access controller (NAC) 22 is another specially programmed computer. NAC 22 is used, in conjunction with DAC 28, to grant or deny network access to subscriber nodes. When a subscriber node, such as subscriber node 40 wishes to gain access to the communication network in order to communicate with a service node, the subscriber node sends a message requesting service by NAC 22 via upstream channel 12 (which, in this instance, is a specially allocated unsecured "home" channel reserved for communication between NAC 22 and subscriber nodes requesting initial access to the network). NAC 22 receives the access request via path 26, over which NAC 22 monitors the downstream channel 14. In response to the access request, NAC 22 will transmit an encrypted channel access code (CAC) to the subscriber node 40 via path 24, upstream channel 12, downstream channel 14, and path 44. The CAC is encrypted using a secret node key unique to subscriber node 40, a record of which is stored in NAC 22.

The subscriber node 44 decrypts the CAC, using the secret node key assigned thereto. The decrypted CAC is, in turn, used to generate frame verifier (FV) codes which are required in order to communicate with a service node coupled to the communication network. The subscriber node also generates frame sequence (FS) codes to keep track of successive data packets (with FV codes attached) that are transmitted by the subscriber node.

Figure 5:
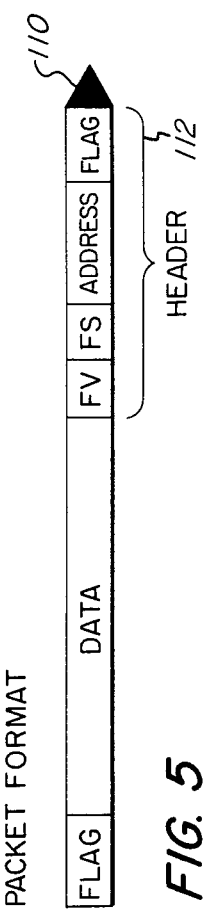
FIG. 5 illustrates the packet format used in conjunction with the present invention.

Once access to communication network 10 is achieved by subscriber node 40, data transfer will proceed in accordance with a packet format such as that shown in FIG. 5. Packet 110 includes a header 112 that commences with a standard flag, the addresses of the source and destination nodes for the packet, and the frame sequence (FS) and frame verifier (FV) codes generated by the subscriber node. The data to be communicated follows header 112, and the packet is ended with a standard flag. Additional data can be included in header 112 if necessary to provide other functions.

In accordance with the present invention, distributed access controller (DAC) 28 continually listens to downstream channel 14 via path 32. DAC 28 is provided with the same CAC transmitted to subscriber node 40 by NAC 22. A direct link 46 (e.g., a standard RS-232 communication path) is provided between NAC 22 and DAC 28 for this purpose. Since a secure direct link is provided, the CAC does not have to be encrypted when it is input to DAC 28. Further, the need for an out of band channel, as described in the co-pending application, is eliminated because DAC 28 and NAC 22 can be situated at the same location, making the direct link 46 possible. The elimination of the need for an out of band channel is a substantial benefit provided by the present invention.

DAC 28 uses the CAC to compute the same FV codes which should be generated by subscriber node 40. As long as the FV codes generated by the subscriber node are valid, DAC 28 stays in its idle state. In the event that DAC 28 detects an invalid FV code, a jamming signal is transmitted via path 30 to upstream channel 12, thereby jamming further communication by obliterating the data which subscriber node 40 is attempting to send.

Figure 4:
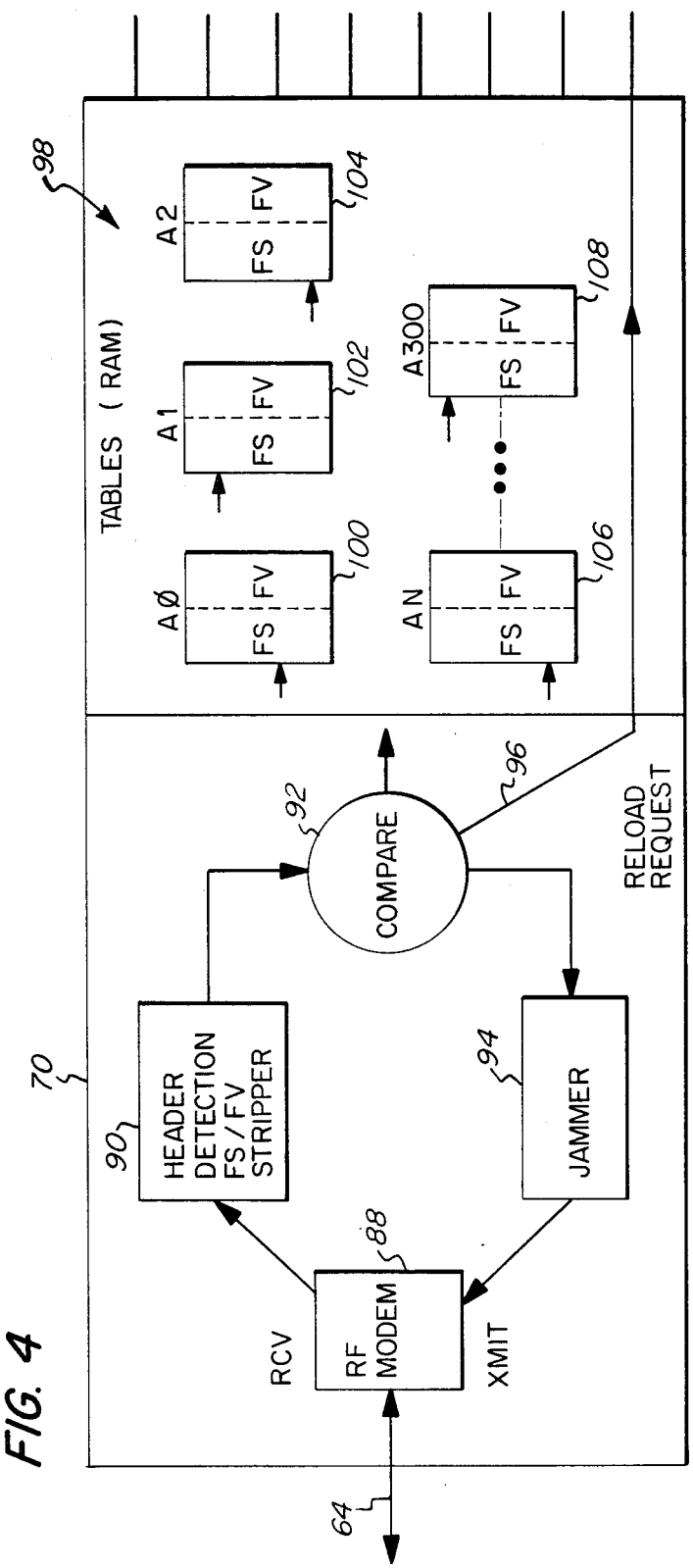
FIG. 4 is a block diagram of one of the distributed access controller ("DAC") channel cards shown in FIG. 3.

The operation of DAC 28 is best understood by referring to FIGS. 3 and 4. A coaxial cable 60, over which data to be communicated throughout the communication network travels, is coupled to a splitter 62. Splitter 62 enables a plurality of DAC channel cards 70, 72, 74 to be coupled, via cables 64, 66, and 68 respectively, to cable 60. A backplane 76 provides a means for coupling each of DAC channel cards 70, 72, 74 to a master controller 80. A local control terminal 82 coupled to master controller 80 enables a system operator or a service provider to interface with the system. A NAC 84 is coupled to master controller 80 via an RS-232 interface 86. Power for the system is provided by a power supply 78, coupled to the system through backplane 76.

As shown in FIG. 4, each DAC channel card (e.g., card 70) includes an RF modem 88 for communication with the network. A received, demodulated signal is processed by appropriate logic 90 to detect the header and strip the FS and FV codes therefrom. A look-up table 98 is provided using random access memory (RAM).

In a communication network such as a CATV system, approximately 300 different nodes can communicate on each channel at the same time using standard multiplexing (e.g. CSMA/CD) techniques. Look-up table 98 contains sufficient memory to accomodate FS and FV codes for each such node. As shown in FIG. 4, memory 100, 102, 104, 106 and 108 is provided to accomodate different nodes using the channel.

The necessary information for computing the FS and FV codes (e.g., the CAC) is communicated to master controller 80 via RS-232 interface 86 so that master controller 80 can compute the FS and FV codes. The computed FS and FV codes are then loaded by master controller 80 into the look-up tables 98 in appropriate DAC channel cards 70, 72, 74.

Once the look-up tables are loaded, the incoming FS and FV codes from the communication network (detected by logic 90) are compared using logic 92 to the corresponding FS and FV codes stored in look-up tables 98 using the source address as an index. Comparison logic 92 comprises standard hardware and software well-known in the art. If proper correspondence is not found between a frame verifier code for a given frame transmitted by a subscriber node (as detected by logic 90) and the corresponding FV code stored in look-up tables 98 for the subscriber node, a jammer 94 is actuated to transmit an interfering signal (e.g., a bit stream of all ones, a carrier signal, or the like) to RF modem 88. Modem 88, in turn, transmits the interfering signal on the corresponding upstream channel in the communication network, thereby obliterating the remaining data in the data packet which the unauthorized subscriber node is attempting to transmit through the network. If, on the other hand, comparision logic 92 determines that the FV code sent by the subscriber node matches the corresponding FV code stored in look-up tables 98 for the particular frame and subscriber node, jammer 94 is not actuated, and the data following the header in the data packet transmitted by the subscriber node is allowed to pass through the communication network without interference.

The storage available in the RAM of look-up tables 98 is limited. Therefore, master controller 80 only computes the FS/FV codes for a limited number of frame sequences at a time. This data will be stored into RAM, and when all or a portion of it has been used, a reload request is passed on line 96 from comparison logic 92 to advise master controller 80 that a new set of FS/FV codes must be loaded into the look-up tables. In this manner, the process of comparing FV codes generated by the subscriber node and FV codes computed by the master controller can continue on a real-time basis.

Service node 34 can provide any of a wide variety of consumer or commercial services such as home banking, electronic mail and newspapers, shop at home, and the like. A provider of such services can couple its computers to the upstream channel of the communication network via path 36 and the downstream channel via path 38 of service node 34.

Figure 6:
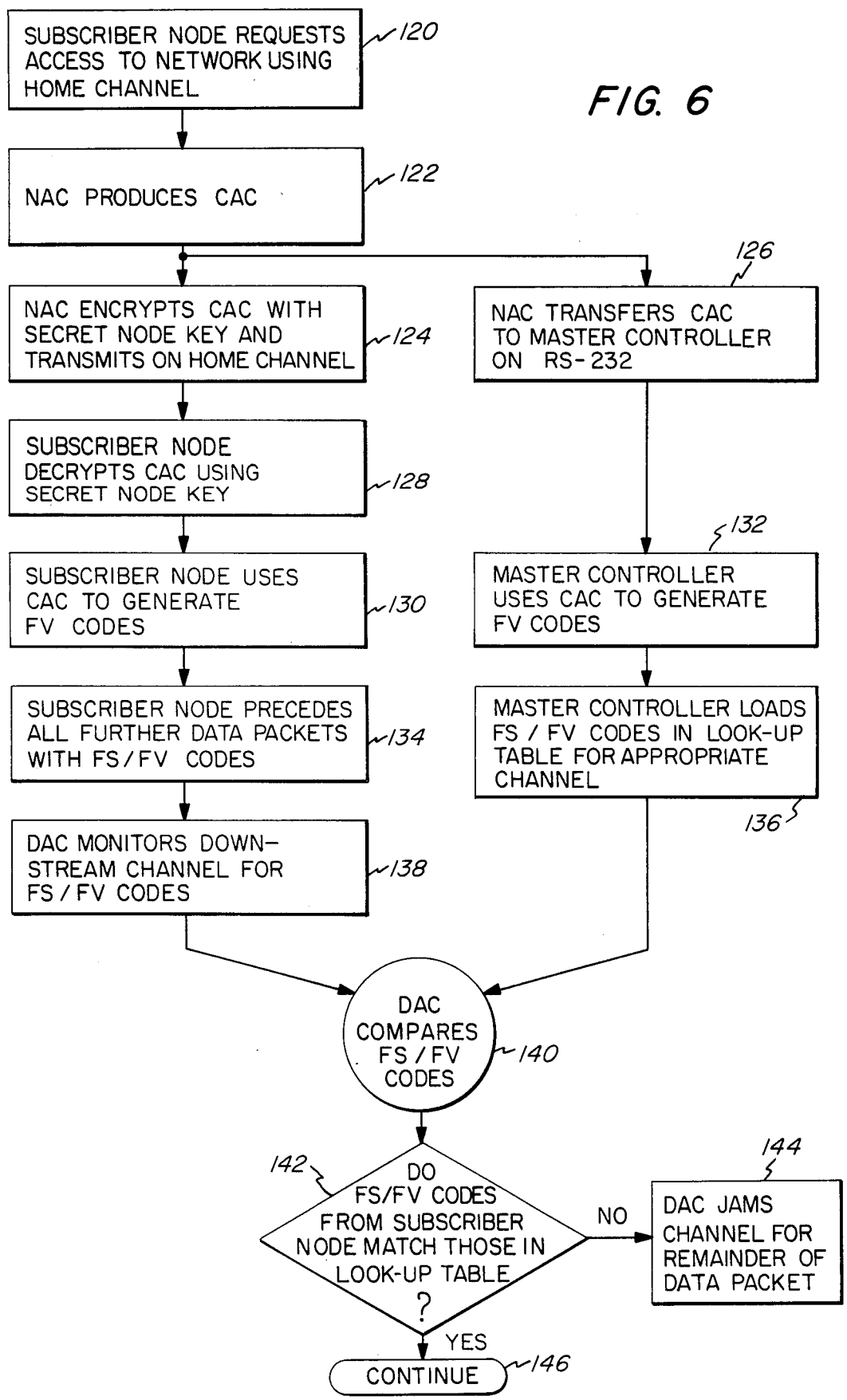
FIG. 6 is a flow chart illustrating the operation of the distributed access controller.

The overall operation of the access restricting apparatus and method of the present invention can be easily understood by referring to the flow chart of FIG. 6. As shown at box 120, a subscriber node desiring to communicate on the network requests access using a special "home" channel which is monitored by the network access controller. The home channel can be provided with minimal security protection to prevent unauthorized users from communicating with each other thereacross. For example, the home channel can require data to be transmitted in a rigid packet format which would make it difficult to use the channel for general data communication. Simple point to point encryption could also be used on the home channel, if desired. Other implementations of a home channel will be apparent to those skilled in the art.

Once a request by a subscriber node for access to the network is detected by the network access controller, the NAC produces a channel access code, as shown at box 122. At box 124, the NAC encrypts the CAC using the secret node key of the subscriber node requesting access. The encrypted CAC is transmitted to the subscriber node on the home channel. At the same time, the NAC transfers the CAC to the master controller (which can be considered to be part of the NAC) on a RS-232 communication line (or other direct link) as shown at box 126. Since a direct link is used between the NAC and the master controller, there is no need to encrypt the CAC. At box 132, the master controller uses the CAC to generate frame verifier codes. At box 136, frame sequence and frame verifier codes computed by the master controller are loaded into the look-up table for the appropriate channel.

At box 128, the subscriber node decrypts the CAC received on the home channel. The subscriber node's secret node key is used for the decryption. Then, at box 130, the decrypted CAC is used by the subscriber node to generate frame verifier codes. All subsequent data transmitted by the subscriber node on the network is in the form of data packets containing the FS/FV codes in the header, as shown at box 134.

The distributed access controller monitors the downstream channel for the FS/FV codes contained in the data packets transmitted by the subscriber node (box 138). At box 140, the DAC compares the FS/FV codes from the subscriber node with the FS/FV codes computed by the master controller and loaded in the look-up table. If, at box 142, the FS/FV codes compared at box 140 do not match, the DAC jams the channel for the remainder of the data packet (box 144). If, on the other hand, the FS/FV codes from the subscriber node and in the look-up table match, control passes to box 146, and the process of comparing subsequent FS/FV codes continues for as long as the subscriber node continues to transmit data on the communication network.

It should be appreciated that after the NAC transmits the encrypted CAC to the subscriber node on the home channel, a different channel can be used for actual data communication between the subscriber node and a desired service node. The mechanism for addressing various nodes in the network and changing channels to establish signal path connections between various nodes is explained fully in the co-pending application.

It should now be appreciated that the present invention provides apparatus and a method for restricting access to a communication network to only authorized subscriber nodes. Access control is provided by a distributed access controller which can be located anywhere on the communication network. The distributed access controller continuously eavesdrops on the downstream communication channel of the communication network. FV codes generated by a subscriber node trying to communicate on the network and contained in a header of a data packet are compared with corresponding FV codes computed by the DAC. If an invalid frame verifier code generated by a subscriber node is detected, a jammer is actuated to place an interfering signal, such as a bit stream of all ones, on the upstream channel of the network. This will effectively prevent the remaining data in the packet sent by the subscriber node from being communicated throughout the network.

What is claimed is:

1. In a communication network having:
   an upstream communication channel,
   a downstream communication channel,
   at least one service node for providing services to subscribers using the network,
   at least one subscriber node including:
      means for generating a frame verifier code, and
      means for transmitting said frame verifier code on the upstream communication channel of said network, and
   packet repeater means for receiving communications on said upstream communication channel and retransmitting the same on said downstream communication channel,
   the improvement comprising:
   access restricting apparatus including:
      means coupled to said downstream channel for examining the frame verifier code from said subscriber node for validity; and
      means for jamming said upstream channel if an invalid frame verifier code is detected by said examining means.

2. The communication network of claim 1, wherein said access restricting apparatus is remotely located on said network from said packet repeater means.

3. The communication network of claim 1 comprising a plurality of subscriber nodes, each having secret node key means for use in enabling the subscriber nodes to generate frame verifier codes.

4. The communication network of claim 1 comprising a plurality of upstream and downstream channel pairs, and wherein said jamming means jams only a particular upstream channel on which an unauthorized communication is attempted by a subscriber node transmitting an invalid frame verifier code.

5. The communication network of claim 4 wherein said jamming means jams an upstream channel on a real time basis only when an unauthorized subscriber node is actively attempting to transmit data on the network.

6. Apparatus for restricting access to a communication network having at least one service node for providing services to subscribers using the network, said apparatus comprising:
   a subscriber terminal, coupled to said communication network, including:
      a secret node key,
      means for generating a succession of frame verifier codes derived through the use of said secret node key, and
      means for transmitting said frame verifier codes on said network;
   a network access controller, coupled to said communication network, including:
      means for computing the succession of frame verifier codes which should be generated by said subscriber terminal; and
   a distributed access controller, coupled to said communication network, including:
      look-up table means for storing the succession of frame verifier codes computed by said network access controller;
      means for detecting the frame verifier codes transmitted by said subscriber terminal and comparing same to the frame verifier codes stored in said look-up table means; and
      means for jamming said communication network if proper correspondence between the detected and stored frame verifier codes is not found to exist.

7. The apparatus of claim 6 wherein said communication network includes an upstream communication channel, a downstream communication channel, and packet repeater means for receiving communications from said upstream communication channel and retransmitting the same on said downstream communication channel.

8. The apparatus of claim 7 wherein said distributed access controller is remotely located on said network from said packet repeater means.

9. The apparatus of claim 8 wherein said jamming means is coupled to jam the upstream communication channel of said communication network when proper correspondence between the detected and stored frame verifier codes is not found to exist.

10. The apparatus of claim 9 wherein said jamming means operates by outputting an interfering signal on said upstream communication channel.

11. The apparatus of claim 6, wherein said communication network includes a plurality of upstream and downstream communication channel pairs, and said distributed access controller jams a particular upstream channel only when access to the channel is attempted by a subscriber terminal generating an invalid frame verifier code.

12. The apparatus of claim 6 wherein said network access controller further comprises:
   a record of the secret node key for said subscriber terminal;
   means for generating a channel access code for use in computing said frame verifier codes;
   means for encrypting said channel access code using said secret node key; and
   means for transmitting the encrypted channel access code on said network; and
   wherein said subscriber terminal further comprises:
   means for receiving the encrypted channel access code from said network;
   means for decrypting the encrypted channel access code using said secret node key; and
   means for using the decrypted channel access code to generate said frame verifier codes.

13. The apparatus of claim 12 comprising a plurality of subscriber terminals coupled to said communication network, each terminal having a different secret node key, and wherein said network access controller includes a record of the secret node key for each subscriber terminal.

14. A method for restricting access to a communication network to only authorized subscriber nodes comprising the steps of:
- providing each authorized subscriber node with a unique secret node key;
- using the secret node key to enable a succession of frame verifier codes to be computed;
- transmitting the frame verifier codes from a subscriber node seeking access to the communication network;
- examining the frame verifier codes to determine whether they are valid; and
- jamming the communication network to prevent communication thereon by said subscriber node if the frame verifier codes are not valid.

15. A method for restricting access on a communication network having an upstream communication channel and a downstream communication channel to only authorized subscriber nodes comprising the steps of:
- providing each authorized subscriber node with a unique secret node key;
- using the secret node key to enable a succession of frame verifier codes to be computed;
- transmitting the frame verifier codes from a subscriber node seeking access to the communication network on the upstream communication channel;
- repeating the frame verifier codes from the upstream communication channel on the downstream communication channel;
- examining the frame verifier codes on the downstream communication channel to determine whether they are valid; and
- jamming the upstream communication channel to prevent communication on the network by a subscriber node if the frame verifier codes transmitted by the subscriber node are not valid.

* * * * *